(12) United States Patent
Madhavan et al.

(10) Patent No.: US 7,777,199 B2
(45) Date of Patent: Aug. 17, 2010

(54) SYSTEM AND METHOD FOR CAPTURING IMAGE SEQUENCES AT ULTRA-HIGH FRAMING RATES

(75) Inventors: Viswanathan Madhavan, Wichita, KS (US); Ala Hijazi, Wichita, KS (US)

(73) Assignee: Wichita State University, Wichita, KS (US)

( * ) Notice: Subject to any disclaimer, the term of this patent is extended or adjusted under 35 U.S.C. 154(b) by 379 days.

(21) Appl. No.: 10/943,702

(22) Filed: Sep. 17, 2004

(65) Prior Publication Data
US 2006/0061680 A1   Mar. 23, 2006

(51) Int. Cl.
*G01N 21/64* (2006.01)
*G03B 15/03* (2006.01)

(52) U.S. Cl. ............... 250/458.1; 250/459.1; 396/173; 396/182

(58) Field of Classification Search ............. 250/458.1, 250/459.1; 396/173, 182, 180
See application file for complete search history.

(56) References Cited

U.S. PATENT DOCUMENTS

| | | | |
|---|---|---|---|
| 2,817,265 A | 12/1957 | Covely, III | |
| 4,256,962 A | 3/1981 | Horton et al. | |
| 4,288,691 A | 9/1981 | Horton | |
| 4,589,030 A | 5/1986 | Kley | |
| 4,597,015 A | 6/1986 | Johnson | |
| 4,646,156 A | 2/1987 | Iizuka et al. | |
| 4,681,436 A | 7/1987 | Ching et al. | |
| 4,851,914 A | 7/1989 | Pfanhouser et al. | |
| 5,098,426 A | 3/1992 | Sklar et al. | |
| 5,130,533 A | 7/1992 | Ruf | |
| 5,233,182 A | 8/1993 | Szabó et al. | |
| 5,410,349 A | 4/1995 | Tanigawa et al. | |
| 5,515,169 A | 5/1996 | Cargill et al. | |
| 5,604,588 A | 2/1997 | Goedert | |
| 5,734,507 A | 3/1998 | Harvey | |
| 6,157,408 A | 12/2000 | Etoh | |
| 6,335,757 B1 | 1/2002 | Vodanovic | |
| 6,580,935 B1 | 6/2003 | Wach et al. | |

(Continued)

FOREIGN PATENT DOCUMENTS

DE   42 12271   7/1993

OTHER PUBLICATIONS

Timothy Schmidt, et al., Full-Field Dynamic Displacement and Strain Measurement Using Advanced 3D Image Correlation Photogrammetry, Experimental Techniques, Part I, May/Jun. 2003, pp. 47-50, and Part II, Jul./Aug. 2003, pp. 44-47, vol. 27 Issues 3 and 4.

(Continued)

*Primary Examiner*—David P Porta
*Assistant Examiner*—David S Baker
(74) *Attorney, Agent, or Firm*—Stinson Morrison Hecker LLP

(57) ABSTRACT

An imaging system for capturing a sequence of images from a target at ultra-high framing rates is disclosed. The imaging system includes an illumination system operable to emit at least first and second light pulses at first and second wavelengths, respectively. The first and second light pulses sequentially illuminate the target whereupon at least first and second propagated light pulses emanate from the target. The system also includes at least first and second image sensors operable to receive the first and second propagated light pulses, respectively, to thereby capture the sequence of images from the target. Various exemplary embodiments of the imaging system and associated method are provided.

4 Claims, 4 Drawing Sheets

U.S. PATENT DOCUMENTS

| | | | | |
|---|---|---|---|---|
| 6,606,113 | B2* | 8/2003 | Nakamura | 348/45 |
| 6,652,461 | B1* | 11/2003 | Levkovitz | 600/443 |
| 7,164,810 | B2* | 1/2007 | Schnee et al. | 382/313 |
| 2003/0058346 | A1* | 3/2003 | Bechtel et al. | 348/207.99 |
| 2004/0170304 | A1* | 9/2004 | Haven et al. | 382/115 |

OTHER PUBLICATIONS

U.S. Statutory Invention Registration, Reg. No. H1740 (published Jul. 7, 1998).

DRS Technologies, Imacon 200. (http://www.drs.com/products/index.cfm?gID=11&productID=291&PrintFriend=1.), Nov. 19, 2004.

PCO.Imaging, hsfc pro (http://www.pco.de/php/products/index_1-en_01030301&view=detail&cam=28 html), Nov. 19, 2004.

Cordin Company, 500 Series Cameras (http://cordin.com/productsie.html), Oct. 7, 2004.

PCO.Imaging, sensicam qe (http://www.pco.de/php/products/index_1en_01030101&view=detail&cam=19.html), Nov. 19, 2004.

Bretthauer, Meier and Stasicki, "An Electronic Cranz-Shardin Camera", Rev. Sci. Instrum, 62 (2), Feb. 1991, pp. 364-368.

Burt, "Extending the Performance Limits of CCD Image Sensors", GEC Journal of Research, vol. 12, No. 3, 1995, pp. 130-140.

Lowrance, Mastrocola, Renda, Swain, Kabra, Bhaskaran, Tower and Levine, "Ultra-High Frame CCD Imagers", Ultrahigh- and High-Speed Photography, Photonics, and Videography, Proc. of SPIE vol. 5210, pp. 67-75, Feb. 6, 2004.

Smith, Phillips, Middleton and Archibald, High Speed CCD Readout Camera System, SPIE vol. 2273, pp. 61-70, Oct. 14, 1994.

Willert, Stasicki, Raffel and Kompenhans, "A Digital Video Camera for Application of Particle Image Velocimetry in High-Speed Flows", SPIE vol. 2546, pp. 124-134, Jul. 10, 1995.

Ball, Burt and Smith, "High Speed Readout CCD'S", SPIE vol. 1358, pp. 409-420.

Wienke and Reckers, "High-Speed PIV Using High-Frequency Diode-Pumped Solid State Laser and Multi-Frame CCD", Paper No. 439, 9$^{th}$ International Symposium on Flow Visualization, Heriot-Watt University, Edinburgh, 2000, pp. 439-1 to 439-4.

Sutton, Wolters, Peters, Ranson and McNeill, "Determination of Displacements Using an Improved Digital Correlation Method", vol. 1 No. 3, Aug. 1983, pp. 133-139.

Luo, Chao, Sutton and Peters, "Accurate Measurement of Three-dimensional Deformations in Deformable and Rigid Bodies Using Computer Vision", Experimental Mechanics, Jun. 1993, pp. 123-132.

Allison and Gillies, "Remote Thermometry with Thermographic Phosphors: Instrumentation and Applications", Rev. Sci. Instrum. 68 (7), Jul. 1997, pp. 2615-2650.

Kontis, Syogenji and Yoshikawa, "Surface Thermometry by Laser-Induced Fluorescence of $Dy^{3+}$:YAG", Paper No. 2683, The Aeronautical Journal, Aug. 2002, pp. 453-457.

S.F. Ray ed. "High Speed Photography and Photonics"; SPIE Press, Bellingham, Washington, 1997, Chs. 5, 9, and 10, pp. 81-94, 150-163 and 167-174.

\* cited by examiner

SYSTEM AND METHOD FOR CAPTURING IMAGE SEQUENCES AT ULTRA-HIGH FRAMING RATES

STATEMENT REGARDING FEDERALLY SPONSORED RESEARCH OR DEVELOPMENT

Not applicable.

CROSS-REFERENCE TO RELATED APPLICATIONS

Not applicable.

BACKGROUND OF THE INVENTION

1. Field of the Invention

The present invention relates to imaging systems and, in particular, to imaging systems that are capable of capturing a sequence of full resolution images at ultra-high framing rates for use in obtaining deformation and/or temperature field measurements of a target under observation.

2. Description of Related Art

High speed imaging systems are widely used in a variety of scientific fields to observe high speed events. Most imaging systems include a light source that illuminates a target, and an image sensor (e.g., a charge coupled device (CCD) array) that captures an image from the target for readout to a memory device. The primary limitation on the maximum framing rates that may be achieved is the time required to readout a captured image to the memory device. Thus, even with the fastest available image sensors, the framing rates of these imaging systems cannot exceed a few kilohertz (kHz) (for high resolution images) due to the limitation on readout time.

In order to achieve higher framing rates, a variety of techniques have been used that rely on reducing the size (i.e., number of pixels) of the image readout to the memory device to thereby decrease the readout time. One technique known as "binning" reduces the size of the image by reading out an averaged value for each neighboring group of pixels on the CCD array (rather than reading out each and every pixel). Another technique known as "windowing" captures a reduced area or window of the field of view of an image (rather than the entire field of view). While the "binning" and "windowing" techniques may be used to achieve framing rates of up to 100 kHz, they do so by decreasing the spatial resolution and/or size of the image.

Another technique that may be used to achieve higher framing rates is similar to the "windowing" technique in that a reduced area of the field of view is used for image capture. However, instead of reading out each image to the memory device immediately after it is captured, multiple images are captured on different areas of the CCD array and then readout together to the memory device. While framing rates of up to 1 megahertz (MHz) may be achieved, this technique also decreases the spatial resolution or size of the images. An example of a camera that employs this technique is the DALSTAR 64k1M™ camera.

Recently, imaging systems have been developed that use a dual-cavity laser to emit two short light pulses in combination with a dual-frame camera (e.g., the PCO SensiCam™ camera or the TSI PowerView™ camera) to capture two full resolution images in very quick succession. As is known in the art, a dual-frame camera uses a frame-transfer CCD array that includes an image region (i.e., the region which is sensitive to light for capturing an image) and a memory or storage region (i.e., the region to which a captured image is transferred for temporary storage prior to readout). Frame-transfer CCDs are widely used in cameras because they enable electronic shuttering and therefore eliminate the need for mechanical shutters. In the dual-frame mode of operation, the image region is exposed a first time whereby a first image is captured and transferred to the memory region for temporary storage and readout. Immediately after the first frame has been transferred to the memory region, the image region may be exposed a second time whereby a second image is captured and remains on the image region until the first image has been readout, whereupon the second image is transferred to the memory region for temporary storage and readout (i.e., the second image remains exposed on the image region for the entire readout time of the first image). The time needed to transfer a captured image from the image region to the memory region is very short (e.g., can be as low as 100 nanoseconds) compared to the readout time (e.g., tens or hundreds of milliseconds). Thus, each dual-frame camera (in conjunction with two short light pulses) can be used to capture two images in very quick succession (i.e., down to the image transfer time), but then has to wait tens or hundreds of milliseconds (i.e., the readout time of the two images) before it can capture another pair of images. The framing rates that may be achieved with this type of imaging system can be as high as 10 MHz, but the number of captured images in the sequence is limited to two.

In order to capture multiple full resolution images at higher framing rates, imaging systems have been used that employ some type of light source in combination with a multi-channel camera that incorporates multiple single or dual-frame cameras. In one such type of imaging system, a light source emits a single flash of light having a duration that is long enough to capture multiple images of a target. The light emanating from the target is then distributed to multiple cameras via the use of a specially designed beam splitter (or multiple 50/50 beam splitters arranged in a branching configuration) that splits the image into multiple identical images. The cameras are then triggered in quick succession so that each camera captures one image (for single-frame cameras) or two images (for dual-frame cameras) from the target. Framing rates of more than 100 MHz may be achieved with this type of imaging system. Examples of such multi-channel cameras are the Cordin-220™ camera, the Imacon 200™ camera, and the PCO HSFC-Pro™ camera.

With the multi-channel imaging system described above, the exposure time of each frame must be extremely short (e.g., in nanoseconds) so as to accommodate the high framing rate. As such, each camera requires the use of an image intensifier that acts as external shutter to control the exposure time of the camera. The image intensifier also amplifies the intensity of a received image in order to compensate for the short exposure time and the division of light by the beam splitter. The problem with the use of image intensifiers, however, is that they degrade the quality of the resulting images. Thus, this type of imaging system is not well-suited for techniques that require high quality images, such as digital image correlation and particle image velocimetry.

In another type of multi-channel imaging system, a light source is used to emit a single flash of light having a duration that is long enough to capture multiple images of a target. However, instead of using a beam splitter, the images from the target are distributed one at a time to multiple cameras via the use of a high-speed rotating mirror. While this type of imaging system does not require the use of image intensifiers, the framing rates are limited to a few megahertz because of the technical limitations imposed by the high-speed rotating mirror (e.g., a rotational speed of 4,000 revolutions per second is needed to capture images at a framing rate of 1 MHz) and the image blurring (known as image drag for this type of camera) caused by the rotation of the mirror. An example of a multi-channel camera of the rotating mirror type is the Cordin-510™ camera.

In yet another type of multi-channel imaging system, multiple nanosecond-pulsed lasers are used to emit multiple light pulses whereupon multiple images sequentially emanate from the target. The images are then distributed to multiple cameras (incorporating frame-transfer or interline CCDs) that are triggered in quick succession whereby each camera captures a single image of the target. This type of imaging system does not require the use of image intensifiers due to the ultra-short duration of the light pulses, which defines the effective exposure time of each camera. However, because the time between light pulses must be greater than the time required to transfer a captured image from the image region to the memory region, the framing rates that may be achieved with this type of imaging system cannot exceed 10 MHz (for cameras with the shortest frame transfer time of 100 nanoseconds given that the exposure time can be set to be 100 nanoseconds or less). An example of such a multi-channel camera is the LaVision SpeedStar-4™ camera, which uses four 1 microsecond exposure cameras to capture four images from a target at a maximum frame rate of 1 MHz. Note that if dual-frame cameras were used, the second image is unusable due to the long exposure time during which multiple exposures would occur.

Thus, there remains a need in the art for an imaging system that is capable of capturing multiple high resolution images at ultra-high framing rates. There is also a need in the art for an imaging system that is capable of capturing multiple images without the use of image intensifiers that cause degradation of image quality. There is a further need in the art for an imaging system that uses multiple dual-frame cameras to capture multiple images from a target, wherein both frames of each dual-frame camera are used for image capture.

BRIEF SUMMARY OF THE INVENTION

The present invention is directed to a system and method for capturing a sequence of images from a target at ultra-high framing rates. In a preferred embodiment, the system includes an illumination system comprising a plurality of light sources (such as dual-cavity pulsed lasers) operable to emit a plurality of light pulses at different wavelengths. The illumination system is triggered in such a manner as to sequentially illuminate the target with the different wavelength light pulses. Upon illumination of the target, a plurality of propagated light pulses at different wavelengths will emanate from the target.

The system also includes a plurality of optical devices (such as beam splitters) operable to direct the different wavelength propagated light pulses emanating from the target to a plurality of image sensors (such as dual-frame cameras) based upon the wavelength of the propagated light pulses. The image sensors are triggered in such a manner as to sequentially receive the propagated light pulses from the optical devices to thereby capture a sequence of images from the target. In accordance with the invention, propagated light pulses of the same wavelength may be directed to only one image sensor such that external shutters (e.g., image intensifiers) are not needed.

The system further includes a computer operable to receive all of the captured images from the image sensors. The computer then processes the captured images using techniques such as digital image correlation, particle image velocimetry, and/or laser induced fluorescence. The computer is also operable to provide timing information to a programmable timing unit that synchronizes the triggering of the light sources and the image sensors. The programmable timing unit may use a variety of different pulsing sequences to trigger the light sources and image sensors to thereby achieve ultra-high framing rates (i.e., up to the gigahertz (GHz) range).

In a first exemplary embodiment, the system comprises four dual-cavity pulsed lasers and four non-intensified dual-frame cameras mounted on a stereo microscope. Two of the dual-frame cameras are mounted so as to share a first viewing axis of the stereo microscope, and the other two dual-frame cameras are mounted so as to share a second viewing axis of the stereo microscope. Advantageously, both frames of each of the dual-frame cameras are used for image capture. In operation, the dual-cavity pulsed lasers and the dual-frame cameras may be triggered in such a manner as to capture a series of eight successive visual images of the target. These images may then be processed using 2D digital image correlation software to obtain a 2D deformation field of the target. Alternatively, the dual-cavity pulsed lasers and the dual-frame cameras may be triggered in such a manner as to capture four sets of two visual images (i.e., four sets of stereo images) of the target. These images may then be processed using 3D digital image correlation software to obtain a 3D deformation field of the target.

In a second exemplary embodiment, the system comprises three dual-cavity pulsed lasers and four non-intensified dual-frame cameras mounted on a stereo microscope. Two of the dual-cavity pulsed lasers are used to illuminate the target for visual imaging, and the third dual-cavity pulsed laser is used to excite a phosphor coating on the target for fluorescent imaging. Two of the dual-frame cameras are mounted so as to share a first viewing axis of the stereo microscope, and the other two dual-frame cameras are mounted so as to share a second viewing axis of the stereo microscope. Again, both frames of each of the dual-frame cameras are advantageously used for image capture. In operation, the dual-cavity pulsed lasers and the dual-frame cameras may be triggered in such a manner as to simultaneously capture a series of four visual images (or two stereo images) of the target and two fluorescence images of the target. The visual images may then be processed using digital image correlation software to obtain a deformation field of the target, and the fluorescence images may be processed using two-line laser induced fluorescence software to obtain a temperature field of the target. Therefore, this system allows the simultaneous observation of the deformation and temperature fields of the target at ultra-high framing rates.

BRIEF DESCRIPTION OF THE DRAWINGS

The system and method of the present invention will be described in greater detail in the following detailed description of the invention with reference to the accompanying drawings that form a part hereof, in which.

DETAILED DESCRIPTION OF THE INVENTION

The present invention is directed to a system and method for capturing a sequence of images from a target at ultra-high framing rates. The invention may be used to capture visual images and/or fluorescence images of a target that may be processed using techniques such as digital image correlation, particle image velocimetry, and/or laser induced fluorescence. While the invention will be described in detail hereinbelow with reference to a preferred embodiment and various exemplary embodiments, it should be understood that the invention is not limited to the specific imaging systems shown in these embodiments. Rather, one skilled in the art will appreciate that a variety of different imaging systems (comprising a variety of different optical devices) may be implemented in accordance with the present invention.

Figure 1:
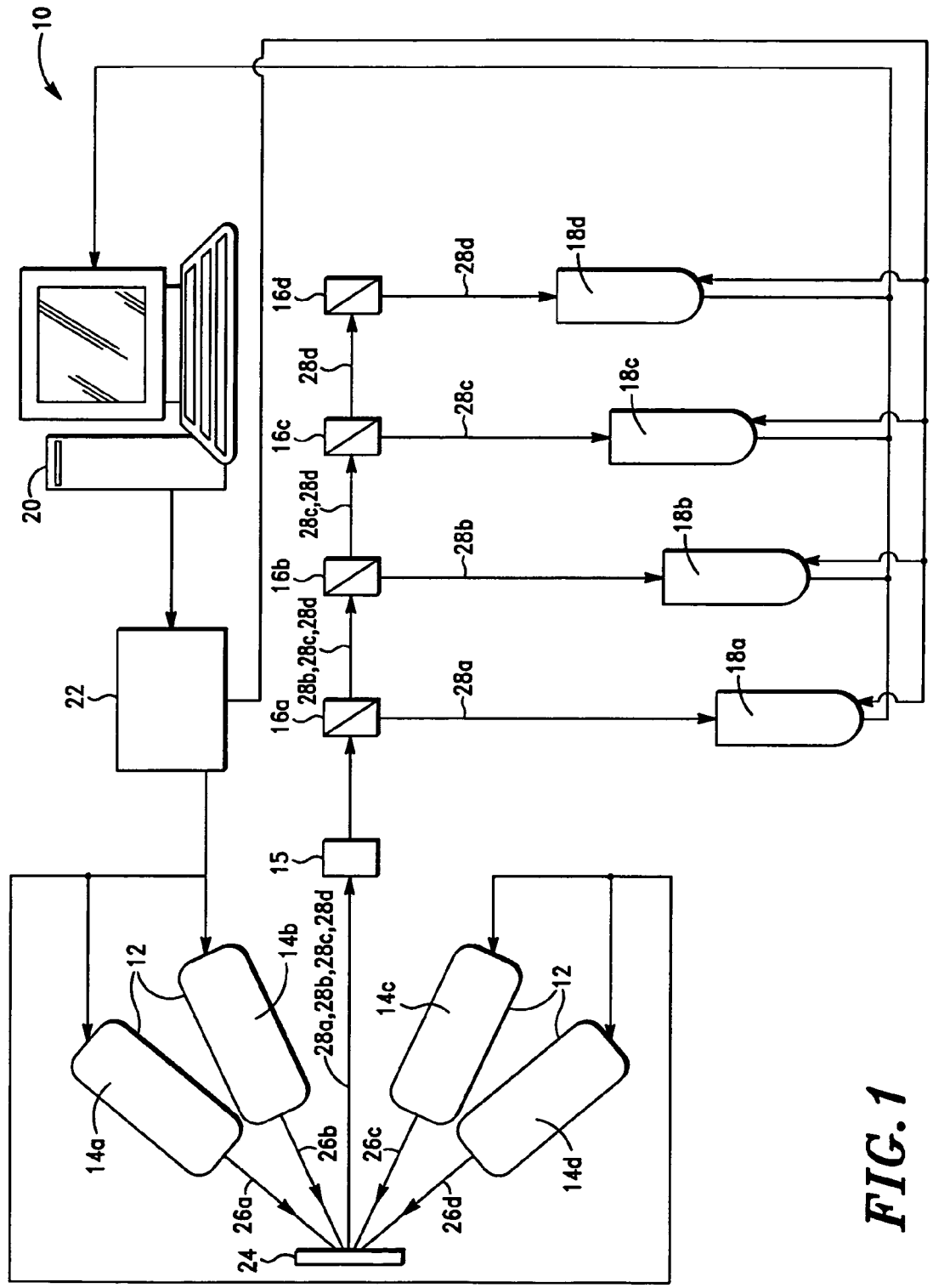
FIG. 1 is a diagram of an imaging system illustrating the principles of operation of a preferred embodiment of the present invention.

Referring to FIG. 1, an imaging system 10 in accordance with a preferred embodiment of the present invention generally includes an illumination system 12 comprising a plurality of light sources 14a, 14b, 14c, 14d (such as dual-cavity pulsed lasers), a lens 15, a plurality of optical devices 16a, 16b, 16c, 16d (such as dichroic beam splitters), a plurality of image sensors 18a, 18b, 18c, 18d (such as dual-frame cameras), a computer 20, and a programmable timing unit 22. Each of the devices within imaging system 10 will now be described in detail.

Illumination system 12 is operable to emit a plurality of light pulses at a plurality of different wavelengths to sequentially illuminate a target 24. In this embodiment, illumination system 12 comprises four light sources 14a, 14b, 14c, 14d that emit light pulses 26a, 26b, 26c, 26d, respectively, at four different wavelengths $\lambda_a$, $\lambda_b$, $\lambda_c$, $\lambda_d$, respectively. Each of light sources 14a, 14b, 14c, 14d consists of a dual-cavity pulsed laser that is capable of emitting two light pulses in quick succession. A single trigger pulse may be used to trigger the laser in each cavity wherein the rising edge of the trigger pulse activates the flash lamp of the laser and the falling edge of the trigger pulse activates the Q-switch of the laser. A light pulse is emitted when the Q-switch is activated. The duration of the trigger pulse will commonly range from 180 microseconds to 190 microseconds, although other values may also be used. Alternatively, two separate trigger pulses may be used to trigger the flashlamp and the Q-switch of each of the lasers, wherein the duration of each of the trigger pulses is substantially shorter. As will be described in greater detail hereinbelow, light sources 14a, 14b, 14c, 14d are triggered by programmable timing unit 22 so as to sequentially emit light pulses 26a, 26b, 26c, 26d, respectively.

It should be understood that illumination system 12 may consist of any combination of optical devices that are capable of emitting a plurality of light pulses at a plurality of different wavelengths to sequentially illuminate target 24. For example, illumination system 12 may consist of one or more of different color pulsed lasers, different color light-emitting diodes (LEDs), or different color diode lasers. Also, illumination system 12 may comprise multiple light sources of the same wavelength in combination with one or more wavelength shifters (e.g., Xenon flashlamps with monochromators or filters; pulsed lasers with optical parametric oscillators (OPOs), dye-cells or Raman shifters; pulsed lasers wherein individual laser pulses are routed through one OPO at slightly different angles). In addition, illumination system 12 may consist of a single light source in combination with a single wavelength shifter (e.g., a high-pulse-rate diode laser with an OPO rotating at a high speed). Of course, other combinations of optical devices will be apparent to those skilled in the art.

Looking again to FIG. 1, it can be seen that light sources 14a, 14b, 14c, 14d directly illuminate target 24 with light pulses 26a, 26b, 26c, 26d, respectively. In response to this illumination, a plurality of propagated light pulses 28a, 28b, 28c, 28d at different wavelengths $\lambda_a$, $\lambda_b$, $\lambda_c$, $\lambda_d$, respectively, will emanate from target 24. In this embodiment, propagated light pulses 28a, 28b, 28c, 28d consist of light pulses that have reflected off of target 24. It should be understood, however, that the propagated light pulses may consist of light pulses that have been transmitted through a target (such as in photoelasticity or shadowgraphy) or light pulses that originate from a target (such as in laser induced fluorescence).

Upon illumination of target 24, lens 15 is operable to image propagated light pulses 28a, 28b, 28c, 28d prior to receipt by optical devices 16a, 16b, 16c, 16d. Alternatively or additionally, a lens may be positioned before each of image sensors 18a, 18b, 18c, 18d in order to image the incoming light prior to image capture.

Optical devices 16a, 16b, 16c, 16d are operable to direct propagated light pulses 28a, 28b, 28c, 28d, respectively, to image sensors 18a, 18b, 18c, 18d, respectively, based upon the wavelength of the propagated light pulses. In this embodiment, each of optical devices 16a, 16b, 16c, 16d consists of a dichroic beam splitter. As such, optical device 16a directs propagated light pulse 28a to image sensor 18a (while allowing propagated light pulses 28b, 28c, 28d to pass through), optical device 16b directs propagated light pulse 28b to image sensor 18b (while allowing propagated light pulses 28c, 28d to pass through), optical device 16c directs propagated light pulse 28c to image sensor 18c (while allowing propagated light pulse 28d to pass through), and optical device 16d directs propagated light pulse 28d to image sensor 18d. In this manner, propagated light pulses of the same wavelength will expose only one image sensor. Of course, those skilled in the art will understand that other types of optical devices may also be used in accordance with the present invention, such as microscopes, stereo microscopes, and filters.

Image sensors 18a, 18b, 18c, 18d are operable to receive propagated light pulses 28a, 28b, 28c, 28d, respectively, from optical devices 16a, 16b, 16c, 16d, respectively. Preferably, image sensors 18a, 18b, 18c, 18d are positioned with respect to target 24 such that the total path length over which each of propagated light pulses 28a, 28b, 28c, 28d must travel is the same. By equalizing the total path length, image sensors 18a, 18b, 18c, 18d will be in focus on target 24 when identical imaging lenses are used. Of course, other positional arrangements for image sensors 18a, 18b, 18c, 18d are also within the scope of the present invention.

In this embodiment, each of image sensors 18a, 18b, 18c, 18d consists of a 5 MHz non-intensified dual-frame camera (such as the PCO SensiCam™ camera or the TSI PowerView™ camera) that is capable of receiving two propagated light pulses in quick succession so as to capture two images from target 24. Of course, it should be understood that other types of image sensors may also be used in accordance with the present invention, such as single-frame cameras, electron multiplied cameras, or any other type of camera. As will be described in greater detail hereinbelow, image sensors 18a, 18b, 18c, 18d are triggered by programmable timing unit 22 so as to sequentially receive propagated light pulses 28a, 28b, 28c, 28d, respectively. As such, image sensors 18a, 18b, 18c, 18d are able to capture a sequence of images from target 24.

In this embodiment, a single trigger pulse is used to trigger each of image sensors 18a, 18b, 18c, 18d. For each image sensor, the duration of the first exposure for capturing the first image may be set to any value, such as 200 nanoseconds. At the end of the first exposure, the first image is transferred from the image region to the memory region (which in this embodiment takes approximately 200 nanoseconds). At this time, the image region is available to capture another image, and the readout of the first image from the memory region to computer 20 is started (which takes approximately 125 milliseconds).

For each image sensor, the duration of the second exposure for capturing the second image may not be set in that the image region remains exposed for the entire period of time needed to readout the first image from the memory region to computer 20 (e.g., 125 milliseconds). This is the reason that the second frame of all but one of the dual-frame non-intensified cameras in the multi-camera systems known in the prior art would be unusable. After the first image has been completely readout from the memory region to computer 20, the second image is transferred from the image region to the memory region and then it is readout to computer 20. The entire process of capturing and reading out two images takes approximately 250 milliseconds and, thus, can be repeated four times each second.

It should be understood that to obtain the minimum interframe time between the first and second images of one image sensor, the first light pulse must be emitted just before the end of the first exposure (i.e., just before the first image is transferred from the image region to the memory region) and the second light pulse must be emitted at the beginning of the second exposure (i.e., just after the first image has been transferred from the image region to the memory region). It should be noted that this is what restricts the maximum framing rate achievable with one camera (having a frame transfer time of 200 nanoseconds) to 5 MHz. Of course, it may be desirable to obtain longer interframe times in certain applications.

Looking again to FIG. 1, computer 20 is operable to receive all of the captured images from image sensors 18a, 18b, 18c, 18d for storage on computer 20. In this embodiment, computer 20 hosts frame-grabber cards that are used to collect the captured images readout from the memory regions of each of the dual-frame cameras. Computer 20 is also operable to provide timing information to programmable timing unit 22. The captured images stored on computer 20 are correlated to this timing information to preserve the proper sequence of the captured images. Computer 20 is further operable to process the captured images using techniques such as digital image correlation, particle image velocimetry, and laser induced fluorescence.

Programmable timing unit 22 uses the timing information received from computer 20 to synchronize the triggering of light sources 14a, 14b, 14c, 14d and image sensors 18a, 18b, 18c, 18d. It should be understood that the triggering sequence for light sources 14a, 14b, 14c, 14d and image sensors 18a, 18b, 18c, 18d will vary between different applications. Various factors will have an impact on this triggering sequence, including: (1) the duration of the trigger pulse sent to each of the lasers within light sources 14a, 14b, 14c, 14d (if a single trigger pulse is used for the flashlamp and the Q-switch) or the time between trigger pulses sent to each of the lasers within light sources 14a, 14b, 14c, 14d (if two trigger pulses are used for the flashlamp and the Q-switch); (2) the duration of the first and second exposures, the image transfer time and the readout time for each of image sensors 18a, 18b, 18c, 18d; (3) the length of the optical path between light sources 14a, 14b, 14c, 14d and target 24; (4) the length of the optical path between target 24 and image sensors 18a, 18b, 18c, 18d; (5) the length of the trigger cables used; and (6) the rise times, delays, etc. of the various components. Of course, other factors will be apparent to one skilled in the art.

Figure 2:
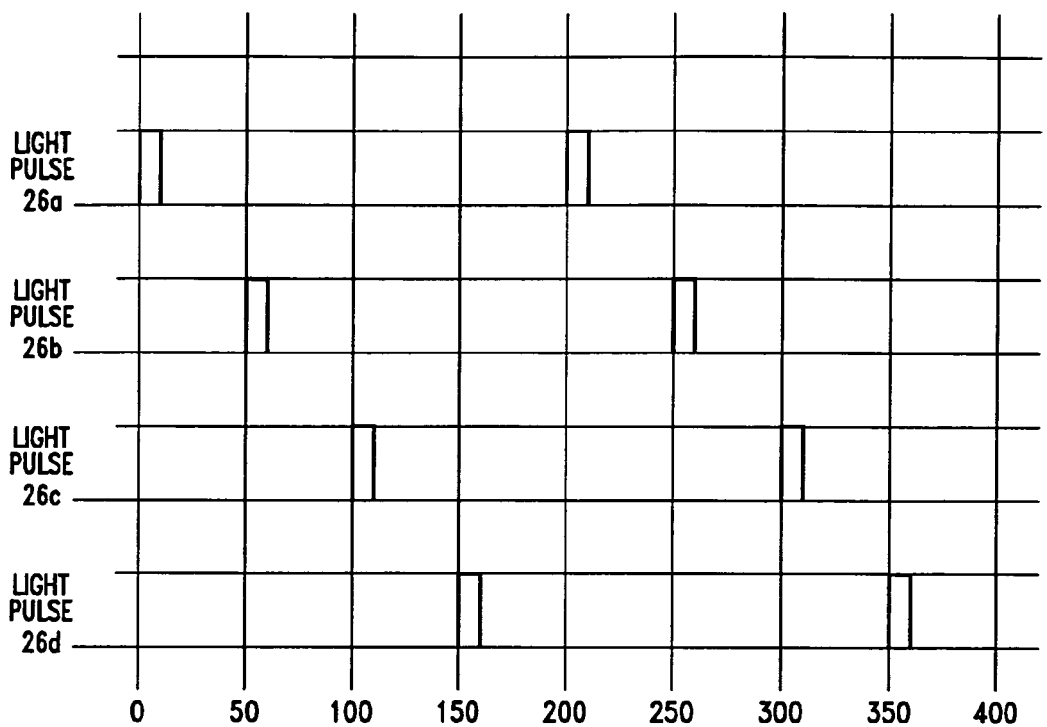
FIG. 2 is a first example of a timing diagram of the light pulses reaching the target surface of the imaging system of FIG. 1, wherein the imaging system is capable of using four dual-frame 5 MHz cameras to capture eight images at a framing rate of 20 MHz.

FIG. 2 is a first example of a timing diagram showing light pulses 26a, 26b, 26c, 26d as they illuminate target 24. In this example, eight images may be captured on image sensors 18a, 18b, 18c, 18d (i.e., two images on each of the image sensors) at 50 nanosecond time intervals to thereby achieve a framing rate of 20 MHz.

First, at 0 nanoseconds, light pulse 26a (which originates from the first laser of light source 14a) illuminates target 24 whereby a first image is captured on image sensor 18a. At 50 nanoseconds, light pulse 26b (which originates from the first laser of light source 14b) illuminates target 24 whereby a second image is captured on image sensor 18b. At 100 nanoseconds, light pulse 26c (which originates from the first laser of light source 14c) illuminates target 24 whereby a third image is captured on image sensor 18c. Then, at 150 nanoseconds, light pulse 26d (which originates from the first laser of light source 14d) illuminates target 24 whereby a fourth image is captured on image sensor 18d.

Next, at 200 nanoseconds, light pulse 26a (which originates from the second laser of light source 14a) illuminates target 24 whereby a fifth image is captured on image sensor 18a. At 250 nanoseconds, light pulse 26b (which originates from the second laser of light source 14b) illuminates target 24 whereby a sixth image is captured on image sensor 18b. At 300 nanoseconds, light pulse 26c (which originates from the second laser of light source 14c) illuminates target 24 whereby a seventh image is captured on image sensor 18c. Then, at 350 nanoseconds, light pulse 26d (which originates from the second laser of light source 14d) illuminates target 24 whereby an eighth image is captured on image sensor 18d. It should be understood that the maximum frame rate achievable increases as the number of image sensors and light sources of different wavelengths increases (until the point when other limits discussed hereinbelow intercede).

It should be noted that, in this example, the time required to transfer a captured image from the image region to the memory region of each of image sensors 18a, 18b, 18c, 18d is approximately 200 nanoseconds. Thus, when the fifth, sixth, seventh and eighth images are captured on the image regions of image sensors 18a, 18b, 18c, 18d, respectively, the first, second, third, and fourth images have already been transferred from the image region to the memory region of image sensors 18a, 18b, 18c, 18d, respectively, for readout to computer 20.

Figure 3:
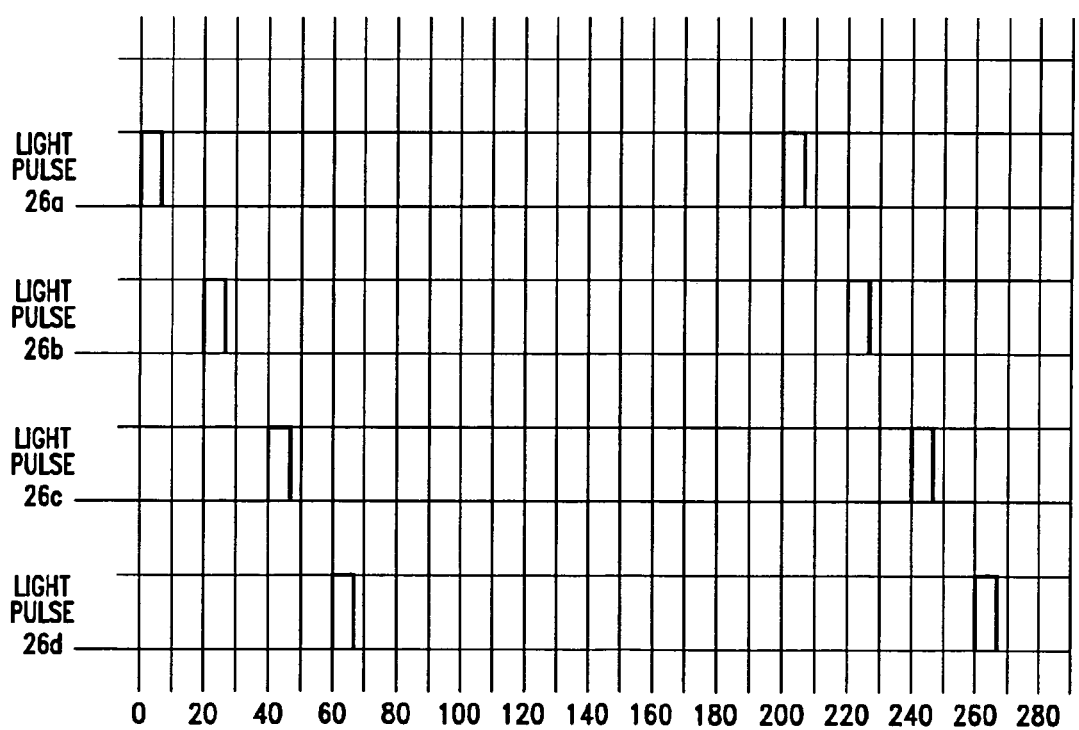
FIG. 3 is a second example of a timing diagram of the light pulses reaching the target surface of the imaging system of FIG. 1, wherein the imaging system is capable of using four dual-frame 5 MHz cameras to capture two groups of four images at a framing rate of 100 MHz per group.

FIG. 3 is a second example of a timing diagram showing light pulses 26a, 26b, 26c, 26d as they illuminate target 24. In this example, two different groups of four images may be captured on image sensors 18a, 18b, 18c, 18d (i.e., two images on each of the image sensors) at 10 nanosecond time intervals to thereby achieve a framing rate of 100 MHz per group.

First, at 0 nanoseconds, light pulse 26a (which originates from the first laser of light source 14a) illuminates target 24 whereby a first image is captured on image sensor 18a. At 10 nanoseconds, light pulse 26b (which originates from the first laser of light source 14b) illuminates target 24 whereby a second image is captured on image sensor 18b. Then, at 20 nanoseconds, light pulse 26c (which originates from the first laser of light source 14c) illuminates target 24 whereby a third image is captured on image sensor 18c. Finally, at 30 nanoseconds, light pulse 26d (which originates from the first laser of light source 14d) illuminates target 24 whereby a fourth image is captured on image sensor 18d. Thus, an image is captured on an image sensor every 10 nanoseconds to thereby achieve a framing rate of 100 MHz for this first group of four images.

Next, at 200 nanoseconds, light pulse 26a (which originates from the second laser of light source 14a) illuminates target 24 whereby a fifth image is captured on image sensor 18a. At 210 nanoseconds, light pulse 26b (which originates from the second laser of light source 14b) illuminates target 24 whereby a sixth image is captured on image sensor 18b. Then, at 220 nanoseconds, light pulse 26c (which originates from the second laser of light source 14c) illuminates target 24 whereby a seventh image is captured on image sensor 18c. Finally, at 230 nanoseconds, light pulse 26d (which originates from the second laser of light source 14d) illuminates target 24 whereby an eighth image is captured on image sensor 18d. Again, an image is captured on an image sensor every 10 nanoseconds to thereby achieve a framing rate of 100 MHz for this second group of four images.

Again, it should be noted that, in this example, the time required to transfer a captured image from the image region to the memory region of each of image sensors 18a, 18b, 18c, 18d is approximately 200 nanoseconds. Thus, when the fifth, sixth, seventh and eighth images are captured on the image regions of image sensors 18a, 18b, 18c, 18d, respectively, the first, second, third, and fourth images have already been transferred from the image region to the memory region of image sensors 18a, 18b, 18c, 18d, respectively, for readout to computer 20.

As can be seen from FIGS. 2 and 3, programmable timing unit 22 may use a variety of different timing sequences in connection with the triggering of light sources 14a, 14b, 14c, 14d and image sensors 18a, 18b, 18c, 18d to achieve ultra-high framing rates. It should be understood that the framing rates that may be achieved are limited only by: (1) the duration of the light pulses emitted by light sources 14a, 14b, 14c, 14d; and (2) the jitter of the electronics.

As to the first limitation, if the duration of the light pulses emitted by light sources 14a, 14b, 14c, 14d is longer than the interframe time, then the movement within a given frame will be larger than the movement between consecutive frames. As such, the captured images will not be particularly useful in determining the deformation field of a target using techniques such as digital image correlation or particle image velocimetry. As to the second limitation, if the jitter of the electronics is relatively large compared to the interframe time, then the timing of consecutive frames may be uncertain. As a result, a light pulse could erroneously be triggered before or after exposure of the corresponding image sensor.

Other examples and variations of imaging system 10 should be apparent to those skilled in the art. For example, if the light pulses emitted by the light sources have a pulse duration of 5 nanoseconds (such as with dual-cavity, Q-switched Nd:YAG lasers), then an image can be captured on one of the image sensors every 5 nanoseconds to achieve a framing rate of 200 MHz. Furthermore, with laser pulse shaping or with pico-second pulsed lasers that are currently available, it is possible to achieve framing rates in the gigahertz (GHz) range (especially with highly reflective targets, so that the energy density of the illumination is sufficient to illuminate the target without heating the target significantly).

Two examples will now be provided to further describe the system and method of the present invention. It should be understood that these examples are provided merely to illustrate the manner in which the invention may be used in connection with techniques such as digital image correlation and laser induced fluorescence. As such, these examples do not in any way limit the scope of the present invention.

EXAMPLE 1

Figure 4:
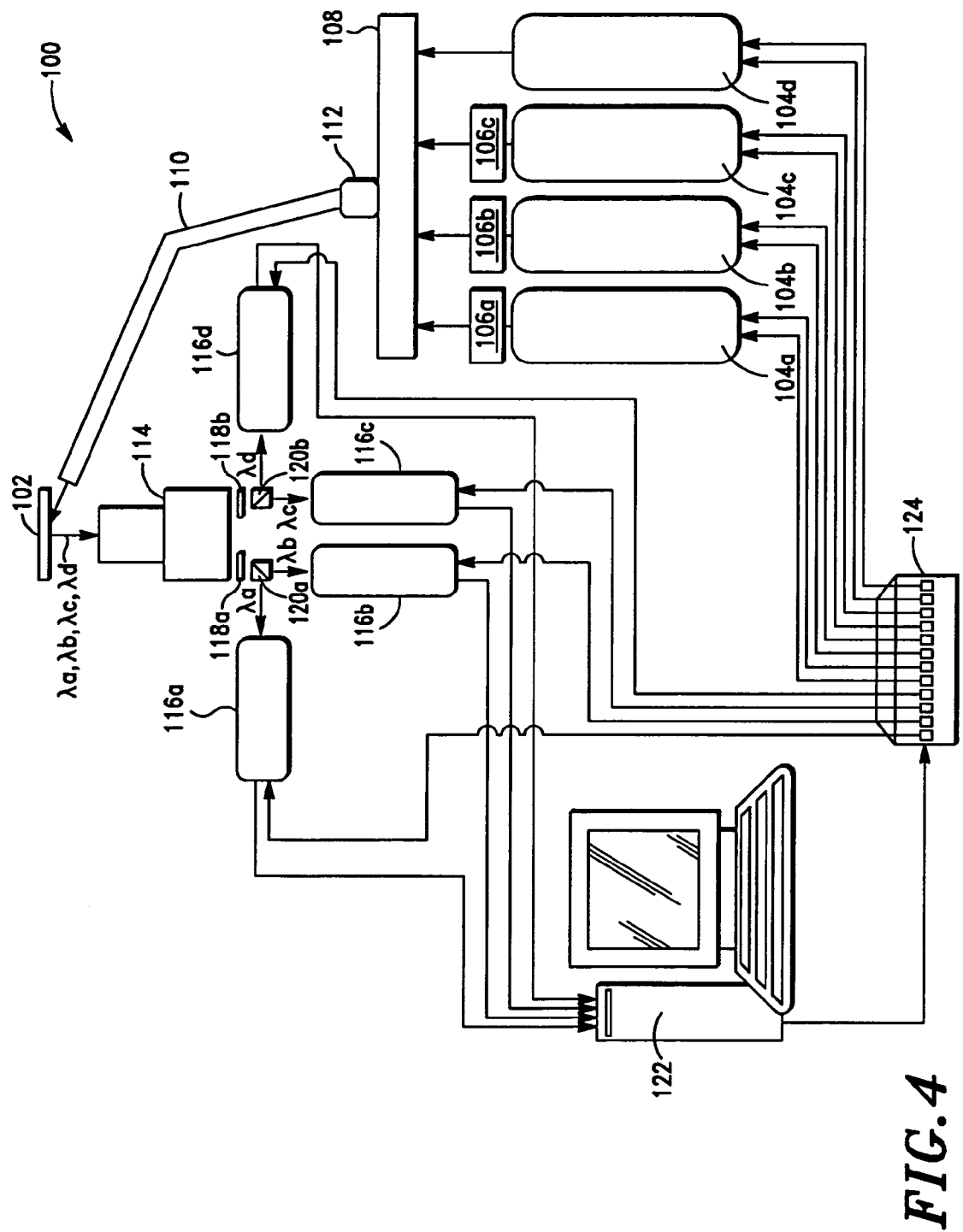
FIG. 4 is a diagram of an imaging system in accordance with a first exemplary embodiment of the present invention, wherein the imaging system consists of four dual-cavity lasers and four dual-frame cameras mounted on a stereo microscope for capturing eight visual images of a target.

Referring to FIG. 4, an imaging system 100 in accordance with a first exemplary embodiment of the present invention may be used to capture eight visual images of a target 102. These eight visual images may then be processed using digital image correlation software to obtain a time history of the deformation field of target 102.

As shown in FIG. 4, imaging system 100 includes four dual-cavity lasers 104a, 104b, 104c, 104d each of which is operable to emit two light pulses in quick succession. In this example, each of lasers 104a, 104b, 104c consists of a dual-cavity, Q-switched Nd:YAG laser that has been frequency-tripled to emit light pulses at a wavelength of 355 nanometers. Laser 104d consists of a dual-cavity, Q-switched Nd:YAG laser that has been frequency-doubled to emit light pulses at a wavelength of 532 nanometers. The light pulses emitted from dual-cavity lasers 104a, 104b, 104c are directed to wavelength shifters 106a, 106b, 106c, respectively, each of which shifts the wavelength of the light pulses to three different wavelengths of 440 nanometers, 610 nanometers and 670 nanometers, respectively. Wavelength shifters 106a, 106b, 106c may comprise any type of wavelength shifter known in the art, such as optical parametric oscillators (OPOs), dye cells or Raman shifters.

A beam combiner 108 (consisting of wavelength selective beam splitters or split optic cables) is also provided to combine the light pulses coming from wavelength shifters 106a, 106b, 106c and laser 104d along a single axis such that they can be delivered to target 102 via optical path 110. If a solid surface is to be imaged without speckle, the light pulses coming out of beam combiner 108 must pass through a decohering element 112 (such as an integrating sphere) that destroys the coherence of the light pulses. However, in fluid mechanics applications, decohering element 112 may not be needed and a cylindrical lens may be used at the end of optical path 110 to form a light sheet. From decohering element 112, the light pulses are delivered to target 102 via optical path 110.

In response to illumination of target 102, propagated light pulses at different wavelengths $\lambda_a$, $\lambda_b$, $\lambda_c$, $\lambda_d$ (which originated from dual-cavity lasers 104a, 104b, 104c, 104d, respectively) will reflect off of target 102 toward stereo microscope 114. In this example, four non-intensified dual-frame cameras 116a, 116b, 116c, 116d are mounted on stereo microscope 114 in a stereoscopic configuration such that dual-frame cameras 116a, 116b share a first viewing axis of stereo microscope 114 and dual-frame cameras 116c, 116d share a second viewing axis of stereo microscope 114.

From stereo microscope 114, the propagated light pulses are directed to wide band-pass filters 118a, 118b. In this example, wide band-pass filter 118a passes wavelengths $\lambda_a$ and $\lambda_b$ (i.e., the wavelengths of the propagated light pulses intended for dual-frame cameras 116a, 116b) and blocks wavelengths $\lambda_c$ and $\lambda_d$. Conversely, wide band-pass filter 118b passes wavelengths $\lambda_c$ and $\lambda_d$ (i.e., the wavelengths of the propagated light pulses intended for dual-frame cameras 116c, 116d) and blocks wavelengths $\lambda_a$ and $\lambda_b$. Of course, it should be understood that wide band-pass filters 118a, 118b could be replaced with four narrow band-pass filters placed just before each of dual-frame cameras 116a, 116b, 116c, 116d (wherein each of the narrow band-pass filters would pass only one of the wavelengths).

The propagated light pulses passed through wide band-pass filters 118a, 118b are directed to dichroic beam splitters 120a, 120b, respectively. The propagated light pulses at wavelength $\lambda_a$ are reflected off of dichroic beam splitter 120a toward dual-frame camera 116a, and the propagated light pulses at wavelength $\lambda_b$ are transmitted through dichroic beam splitter 120a toward dual-frame camera 116b. Similarly, the propagated light pulses at wavelength $\lambda_c$ are transmitted through dichroic beam splitter 120b toward dual-frame camera 116c, and the propagated light pulses at wavelength $\lambda_d$ are reflected off of dichroic beam splitter 120b toward dual-frame camera 116d.

In this manner, dual-frame camera 116a receives the propagated light pulses at wavelengths $80_a$, dual-frame camera 116b receives the propagated light pulses at wavelength $\lambda_b$, dual-frame camera 116c receives the propagated light pulses at wavelength $\lambda_c$, and dual-frame camera 116d receives the propagated light pulses at wavelength $\lambda_d$. In this example, each of dual-frame cameras 116a, 116b, 116c, 116d is capable of receiving two propagated light pulses in quick succession, with time between pulses not lower than the frame transfer time, so as to capture two images of target 102.

Computer 122 is operable to receive all of the captured images from dual-frame cameras 116a, 116b, 116c, 116d for storage. Computer 122 is also operable to provide timing information to programmable timing unit 124. The captured images stored on computer 122 are correlated to this timing information to preserve the proper sequence of the captured images. Computer 122 is further operable to process the captured images using digital image correlation software to obtain a deformation field of target 102.

Programmable timing unit 124 uses the timing information received from computer 122 to synchronize the triggering of lasers 104a, 104b, 104c, 104d and dual-frame cameras 116a, 116b, 116c, 116d. In this example, programmable timing unit 124 includes a 12 channel timing generator, wherein one channel is needed for triggering each of the eight light pulses and one channel is needed for triggering each of the four dual-frame cameras. It should be understood that the triggering sequence for lasers 104a, 104b, 104c, 104d and dual-frame cameras 116a, 116b, 116c, 116d will vary between different applications.

For example, lasers 104a, 104b, 104c, 104d and dual-frame cameras 116a, 116b, 116c, 116d may be triggered in such a manner as to capture a series of eight successive images of target 102 (using a timing sequence similar to that in FIG. 2). These images may then be processed using 2D digital image correlation software to obtain a 2D deformation field of target 102. It should be understood that the digital image correlation software will correct for any distortion caused by the capture of images from different perspective angles in relation to target 102.

Alternatively, lasers 104a, 104b, 104c, 104d and dual-frame cameras 116a, 116b, 116c, 116d may be triggered in such a manner that lasers within each of the two dual-cavity lasers are triggered simultaneously (and two of the dual-frame cameras are triggered simultaneously) to thereby capture four sets of two simultaneous images (i.e., four stereo images) of target 102. These images may then be processed using 3D digital image correlation software to obtain a 3D deformation field of target 102.

EXAMPLE 2

Figure 5:
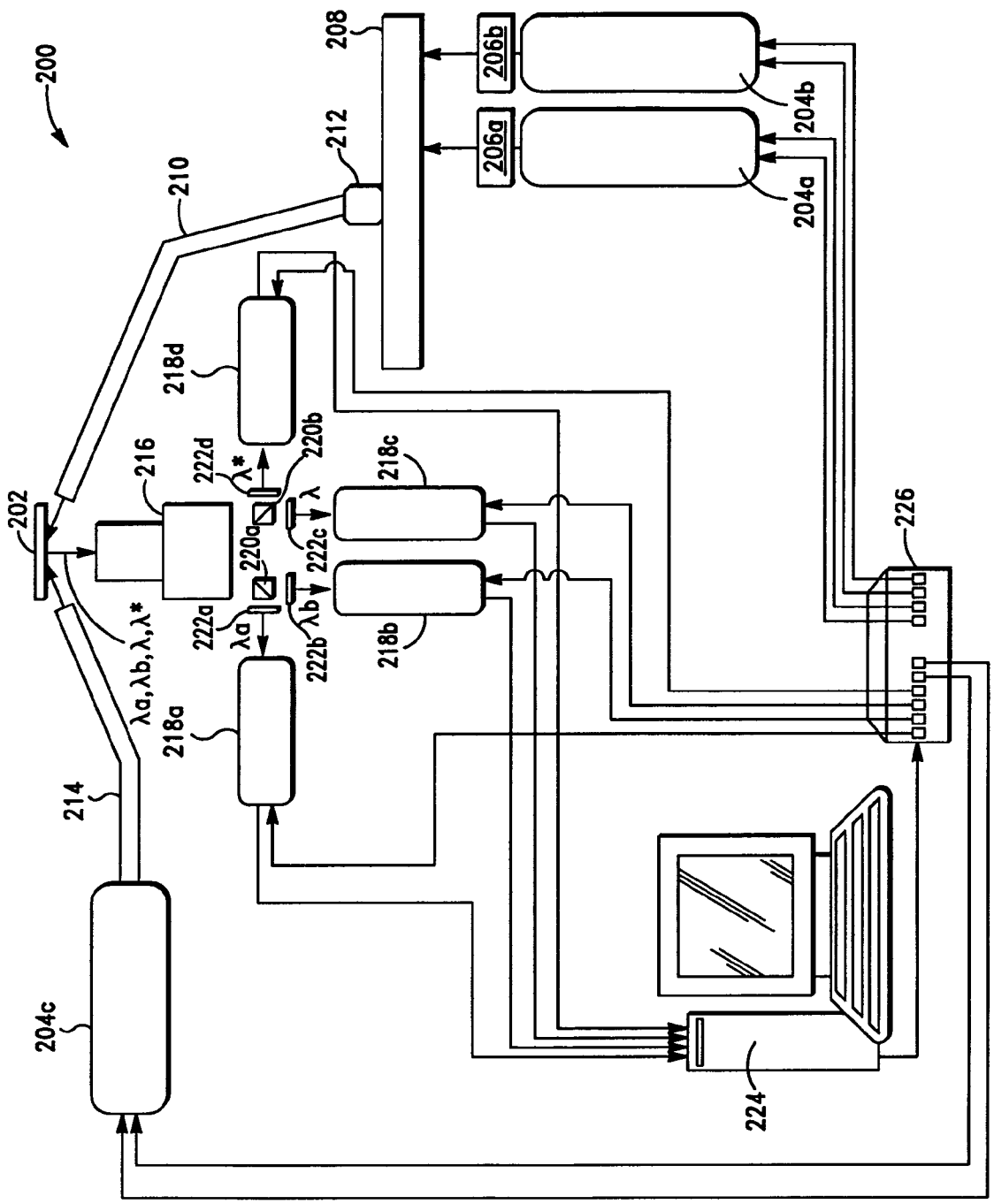
FIG. 5 is a diagram of an imaging system in accordance with a second exemplary embodiment of the present invention, wherein the imaging system consists of three dual-cavity lasers and four dual-frame cameras mounted on a stereo microscope for capturing four visual images of a target and two to three fluorescence images of a target.

Referring to FIG. 5, an imaging system 200 in accordance with a second exemplary embodiment of the present invention may be used to simultaneously capture four visual images and two fluorescence images of a target 202. The four visual images may be processed using digital image correlation software to obtain a deformation field of target 102. The two fluorescence images may be processed using laser induced fluorescence software to obtain a temperature field of target 202.

As shown in FIG. 5, imaging system 100 includes two dual-cavity lasers 204a, 204b, each of which is operable to emit two light pulses in quick succession. In this example, each of lasers 204a, 204b consists of a dual-cavity, Q-switched Nd:YAG laser that has been frequency-tripled to emit light pulses at a wavelength of 355 nanometers. The light pulses emitted from dual-cavity lasers 204a, 204b are directed to wavelength shifters 206a, 206b, respectively, each of which shifts the wavelength of the light pulses to two different wavelengths of 610 nanometers and 670 nanometers, respectively (wherein these wavelengths are selected so that they do not coincide with the wavelengths of the excitation and emission lines of the phosphor on target 202, described below). Wavelength shifters 206a, 206b may comprise any type of wavelength shifter known in the art, such as optical parametric oscillators (OPOs), dye cells or Raman shifters.

Similar to the system of FIG. 4, a beam combiner 208 is also provided to combine the light pulses coming from wavelength shifters 206a, 206b along a single axis such that they can be delivered to target 202 via optical path 210. A decohering element 212 may also be included to destroy the coherence of the light pulses in order to prevent speckle. From decohering element 212, the light pulses are delivered to target 202 via optical path 210.

Imaging system 200 also includes a third dual-cavity laser 204c that is operable to emit two light pulses in quick succession. In this example, laser 204c consists of a dual-cavity, Q-switched Nd:YAG laser that has been frequency-tripled to emit light pulses at a wavelength of 355 nanometers. These light pulses may be used to excite a phosphor coating on target 202 for fluorescent imaging. Of course, it should be understood that the wavelength of these light pulses may comprise any wavelength within the excitation spectrum of the phosphor. Light pulses from dual-cavity laser 204c are then delivered to target 202 via optical path 214.

In response to illumination of target 202, propagated light pulses at different wavelengths $\lambda_a$, $\lambda_b$, $\lambda$, $\lambda^*$ will emanate from target 202 toward stereo microscope 216. It should be understood that the propagated light pulses at wavelengths $\lambda_a$, $\lambda_b$ comprise reflected light pulses that originated from dual-cavity lasers 204a, 204b, respectively. In addition, the propagated light pulses at wavelengths $\lambda$, $\lambda^*$ comprise two different emission lines of the excited phosphor on target 202 that have a different temperature dependence such that the ratio of the intensity of such lines may be correlated to the temperature of target 202.

In this example, four non-intensified dual-frame cameras 218a, 218b, 218c, 218d are mounted on stereo microscope 216 in a stereoscopic configuration such that dual-frame cameras 218a, 218b share a first viewing axis of stereo microscope 216 and dual-frame cameras 218c, 218d share a second viewing axis of stereo microscope 216. It will be seen that cameras 218a, 218b are used to capture visual images from target 202, while cameras 218c, 218d are used to capture fluorescence images from target 202.

From stereo microscope 216, the propagated light pulses are directed to dichroic beam splitters 220a, 220b. The propagated light pulses at wavelength $\lambda_a$ are reflected off of dichroic beam splitter 220a toward dual-frame camera 218a, and the propagated light pulses at wavelength $\lambda_b$ are transmitted through dichroic beam splitter 120a toward dual-frame camera 218b. Similarly, the propagated light pulses at wavelength $\lambda$ are transmitted through dichroic beam splitter 220b toward dual-frame camera 218c, and the propagated light pulses at wavelength $\lambda^*$ are reflected off of dichroic beam splitter 220b toward dual-frame camera 218d. Narrow band-pass filters 222a, 222b, 222c, 222d are placed just before each of dual-frame cameras 218a, 218b, 218c, 218d. As can be seen, narrow band-pass filter 222a passes wavelength $\lambda_a$, narrow band-pass filter 222b passes wavelength $\lambda_b$, narrow band-pass filter 222c passes wavelength $\lambda$, and narrow band-pass filter 222d passes wavelength $\lambda^*$.

In this manner, dual-frame camera 218a receives the propagated light pulses at wavelengths $\lambda_a$, dual-frame camera 218b receives the propagated light pulses at wavelength $\lambda_b$, dual-frame camera 218c receives the propagated light pulses at wavelength $\lambda$, and dual-frame camera 218d receives the propagated light pulses at wavelength $\lambda^*$. In this example, each of dual-frame cameras 218a, 218b, 218c, 218d is capable of receiving two propagated light pulses in quick succession so as to capture two images of target 202.

Computer 224 is operable to receive all of the captured images from dual-frame cameras 218a, 218b, 218c, 218d for storage. Computer 224 is also operable to provide timing information to programmable timing unit 226. The captured images stored on computer 224 are correlated to this timing information to preserve the proper sequence of the captured images. Computer 224 is further operable to process the captured images using digital image correlation software and laser induced fluorescence software to obtain a deformation field and a temperature field of target 102.

Programmable timing unit 226 uses the timing information received from computer 224 to synchronize the triggering of lasers 204a, 204b, 204c and dual-frame cameras 218a, 218b, 218c, 218d. In this example, programmable timing unit 226 includes a 10 channel timing generator, wherein one channel is needed for triggering each of the six light pulses and one channel is needed for triggering each of the four dual-frame cameras. It should be understood that the triggering sequence for lasers 204a, 204b, 204c and dual-frame cameras 218a, 218b, 218c, 218d will vary between different applications.

For example, lasers 204a, 204b and dual-frame cameras 218a, 218b may be triggered in such a manner as to capture a series of four visual images of target 202 (as described above with respect to the system of FIG. 4). These visual images may then be processed using digital image correlation software to obtain a deformation field of target 202. In addition, dual-cavity laser 204c and dual-frame cameras 218c, 218d may be triggered in such a manner that a 355 nm pulse illuminates the target and dual-frame cameras 218c, 218d are triggered simultaneously to thereby capture two simultaneous fluorescence images of target 202. These fluorescence images may then be processed using two-line laser induced florescence software to obtain a temperature field of target 202. Therefore, imaging system 200 allows the simultaneous observation of the deformation and temperature fields of target 202 at ultra-high framing rates. In the event that fast decay time phosphors are used, another pair of images can be obtained from the second frame of cameras 218c, 218d in response to the second pulse from the laser 204c.

While the present invention has been described and illustrated hereinabove with reference to several embodiments, it should be understood that various modifications could be made to these embodiments without departing from the scope of the invention. Therefore, the invention is not to be limited to the embodiments described and illustrated hereinabove, except insofar as such limitations are included in the following claims.

What is claimed and desired to be secured by Letters Patent is as follows:

1. A system for capturing a sequence of images from a target, comprising:
   an illumination system operable to emit at least first and second light pulses at first and second wavelengths, respectively, wherein said first and second light pulses sequentially illuminate said target whereupon at least first and second propagated light pulses emanate from said target, and wherein said first and second propagated light pulses emanate from said target so as to capture fluorescence images of said target for use in obtaining temperature field of said target; and
   at least first and second image sensors operable to receive said first and second propagated light pulses, respectively, wherein said first and second propagated light pulses occur within a single frame, to thereby capture said sequence of images from said target.

2. A system for capturing a sequence of images from a target, comprising:
   an illumination system;
   a plurality of non-intensified cameras; and
   a programmable timing unit operable to trigger said illumination system so as to sequentially emit a plurality of light pulses at a plurality of different wavelengths to illuminate said target whereupon a plurality of propagated light pulses emanate from said target, wherein at least one of said propagated light pulses emanates from said target so as to capture a fluorescence image of said target for use in obtaining a temperature field of said target, and wherein said programmable timing unit is also operable to trigger said plurality of non-intensified cameras so as to sequentially receive said plurality of propagated light pulses within a single frame to thereby capture said sequence of images from said target.

3. The system of claim 2, wherein at least two of said propagated light pulses emanate from said target so as to capture visual images of said target for use in obtaining a deformation field of said target, and wherein at least one of said propagated light pulses emanates from said target so as to capture a fluorescence image of said target for use in obtaining a temperature field of said target.

4. A method for capturing a sequence of images from a target, comprising the steps of:
   triggering an illumination system so as to emit at least first and second light pulses at first and second wavelengths, respectively;
   sequentially illuminating said target with said first and second light pulses whereupon at least first and second propagated light pulses emanate from said target, wherein said first and second propagated light pulses emanate from said target so as to capture fluorescence images of said target for use in obtaining a temperature field of said target; and
   triggering at least first and second image sensors so as to receive said first and second propagated light pulses, respectively, within a single frame; to thereby capture said sequence of images from said target.

* * * * *